United States Patent [19]

LePere

[11] Patent Number: 4,940,278
[45] Date of Patent: Jul. 10, 1990

[54] TRUCK CAB-BED UNIT WINDOW SEAL ASSEMBLY

[76] Inventor: Willard LePere, 1812 N. Waverly, Dearborn, Mich. 48128

[21] Appl. No.: 324,713

[22] Filed: Mar. 17, 1989

[51] Int. Cl.$^5$ .............................................. B60P 3/32
[52] U.S. Cl. ...................................................... 296/166
[58] Field of Search .................. 296/166; 49/475, 105, 49/115; 52/208

[56] References Cited

U.S. PATENT DOCUMENTS

| | | | |
|---|---|---|---|
| 3,321,234 | 5/1967 | Harrell et al. | 296/166 |
| 3,508,786 | 4/1970 | Colville | 296/99.1 |
| 3,625,560 | 12/1971 | Bjork | 296/166 |
| 3,837,700 | 9/1974 | Van Slyke | 296/166 |
| 3,844,603 | 10/1974 | Bjork et al. | 296/166 |
| 3,853,348 | 12/1974 | Bjork et al. | 296/166 |
| 4,114,943 | 9/1978 | Engelhard | 296/156 |
| 4,123,099 | 10/1978 | Mashigan | 296/10 |
| 4,183,573 | 1/1980 | DeRidder | 296/166 |
| 4,222,605 | 9/1980 | Engelhard | 296/166 |
| 4,279,426 | 7/1981 | Flack, Jr. | 296/166 X |
| 4,294,485 | 10/1981 | Engelhard | 296/166 |
| 4,299,422 | 11/1981 | Pettit | 296/166 |
| 4,616,871 | 10/1986 | Pettit | 296/166 |
| 4,627,655 | 12/1986 | Collins | 296/167 |
| 4,671,013 | 6/1987 | Friese et al. | 296/146 X |
| 4,671,560 | 6/1987 | Pettit et al. | 296/166 |

*Primary Examiner*—Robert R. Song
*Attorney, Agent, or Firm*—Gifford, Groh, Sprinkle, Patmore and Anderson

[57] ABSTRACT

A removable seal assembly for interconnecting the rear window of a pick-up style cab with the front window of a bed unit such as a camper or a bed cap. The seal assembly comprises an elastic tunnel having peripheral elastic rings provided at each of its two ends. A frame member with a peripherally defined channel is fixed to the inside of the cab and another such frame member is fixed to the inside of the bed unit. By stretching each ring to fit into its respective frame channel, a weather tight seal is created between the cab and the bed unit.

21 Claims, 2 Drawing Sheets

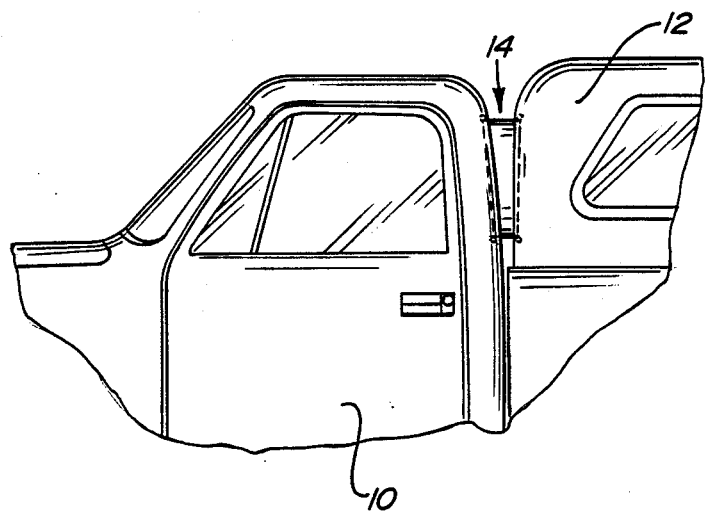
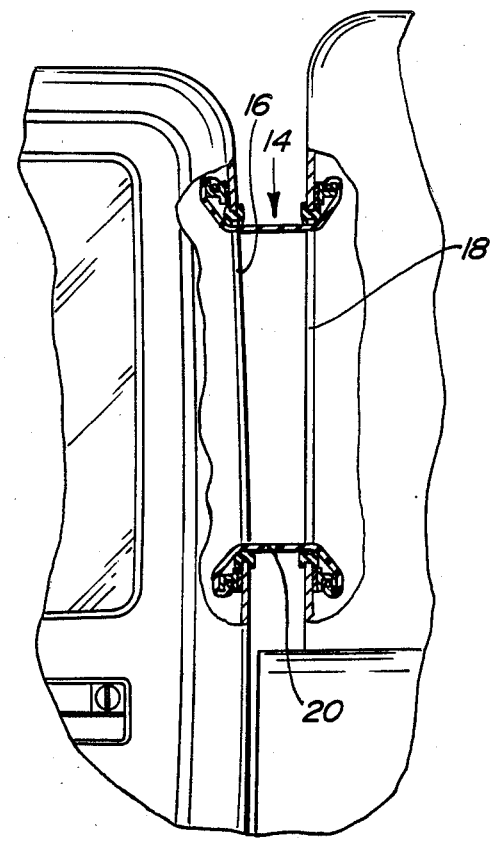
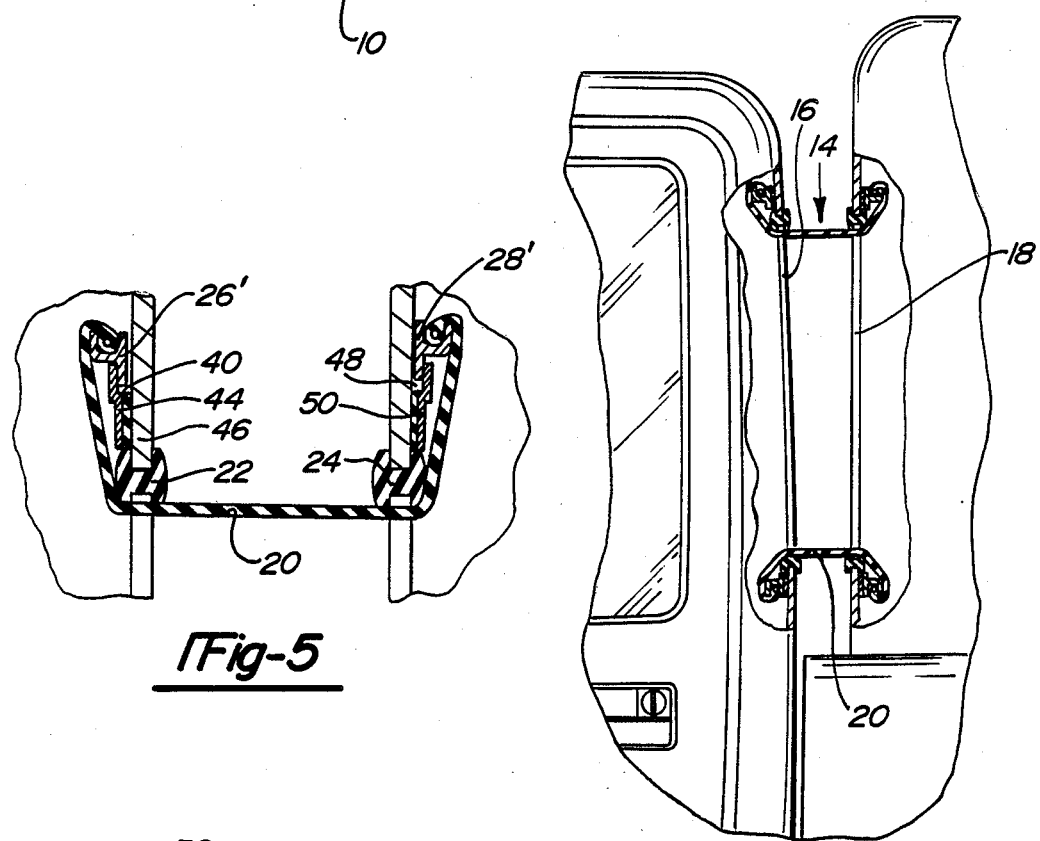
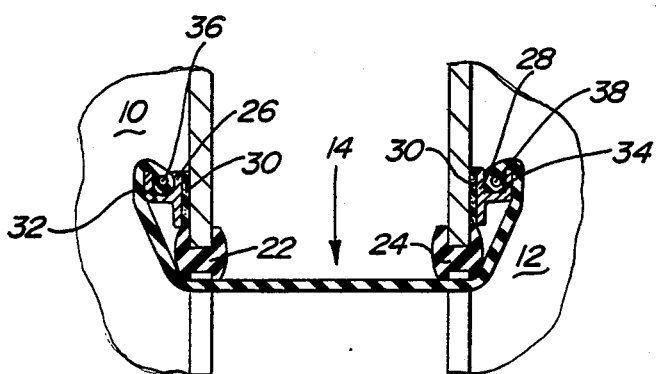

TRUCK CAB-BED UNIT WINDOW SEAL ASSEMBLY

BACKGROUND OF THE INVENTION

I. Field of the Invention

The present invention relates generally to truck cab-bed unit window seals. More particularly, the present invention relates to a light weight seal stretchably and removably fittable between the rear window of the cab of a pick-up truck and the front window of a bed unit such as a camper unit or a bed cap unit.

II. Description of the Relevant Art

In recent years the sales of pick-up trucks, particularly because of competition from overseas and because of a healthy consumer appetite domestically, have increased dramatically. Their presence on the highways for not only use as every day vehicles but also as recreational vehicles can hardly be overlooked. As a concurrent result of this increase in popularity, the production and sales of pick-up truck bed units such as campers or so-called "bed caps" have likewise become remarkable.

Of course, the cab of the pick-up truck is conventionally a sealed unit, that is to say, the rear window of the pick-up truck is conventionally a fixed or a sliding piece of glass. Similarly, the conventionally-provided front facing window of a bed unit such as a camper or cap has also conventionally been of either a fixed or sliding window style. Very often it is desirable for occupants of the cab to communicate with occupants of the camper or truck cap thereby requiring the placement of a tunnel or seal interconnecting the cab and the bed unit. This use is desired not only for communication of occupants in the respective units, but also, for example, for the placement of pets in the bed unit or to provide access of the cab's occupants to goods in the bed unit.

In response to the requirement for such a tunnel structure, a variety of forms of tunnels have been provided. There are two basic forms of such tunnels.

The first of these two basic forms is a boot ring which is placed between the truck cab and the bed unit in a compressed manner. The friction of this boot ring caught between the two units in theory keeps the ring unit in place therebetween. However, what in fact usually happens is that the ring slips out or otherwise moves as a result of movement transmitted from bumps on the roadway or rough roads. In any event, this boot ring has also shown the other disadvantage of not being weather tight.

The second type of seal conventionally seen is one having inflatable ends. The theory behind this seal is that the ends are inflated within, respectively, the cab and the bed unit to thereby create rings on the inside of the cab unit and the inside of the bed unit. The disadvantage with this approach to a seal is that the seal proves bulky and fails to be weather tight. The lack of weatherproofing results from the looseness with which this type of seal is traditionally fitted.

A third means of providing a seal is a permanent boot screwed or otherwise fastened to the inside of the cab and extending through to the inside of the bed unit. However, while improving the weather tight aspects of the boot, this structure is undesirable in that it provides a permanent boot. Very often owners and users of pick-up trucks selectively remove and replace their bed unit as need requires, thereby rendering such permanence highly undesirable.

Accordingly, the prior approaches to solving the problem of providing a tunnel between the cab of a pick-up and the bed unit of a pick-up truck have failed to solve known problems, as prior responses have failed to eliminate the inconvenience and ineffectiveness of known seals or boots.

SUMMARY OF THE PRESENT INVENTION

The present invention provides a removable seal assembly for interconnecting the rear window of a pick-up style cab with the front window of a bed unit such as a camper or a bed cap. The seal assembly comprises an elastic tunnel having peripheral elastic rings provided at each of its two ends.

A frame member with a peripherally defined channel is fixed to the inside of the cab and another such frame member is fixed to the inside of the bed unit. By stretching each ring to fit into the respective frame channel, a weather tight seal is created between the cab and the bed unit.

The elastic tunnel is preferably composed of a polymerized material which has highly resilient and stretchable characteristics.

By stretchably inserting each of the elastic rings into its respective channel of each of the frames provided in the cab and the bed unit, the seal is stretchably fitted and thereby locked into the channel. The stretching action also creates a taught seal between the cab and the bed unit to thereby keep out elements such as rain and snow.

The frame members can either be permanently mounted within each of the cab or bed units, or may be, as an alternate embodiment, "floatingly" fitted on a pair of parallel elongated rails provided above and below each of the window openings on the inside of the respective unit. In this fashion, the rails themselves are permanently or semi-permanently mounted, whereas the frame members may be removed.

The construction of the present invention offers many significant advantages. First, the assembly is very light weight, thereby adding little weight to the overall mass of the vehicle. Second, the seal provided because of the stretched characteristic of the construction produces a weather tight assembly. Third, the assembly may be easily removed. For example, the elastic tunnel may be removed simply by withdrawing the peripheral rings from their respective channels. In the case of the alternate embodiment, the frame members themselves may be removed from the cab or the bed unit.

Each of the channels preferably has the cross section of an "h". By such construction, the peripheral ring can easily be fitted within the channel defined in the frame.

This assembly also eliminates the need to significantly modify either the truck cab or the bed unit window opening. Where the truck cab window and the bed unit window are of the sliding type, the glass can remain intact while the sliding portions are merely slid into their opened positions. The only modification that possibly might prove necessary is that the portions of glass fixed must be removed. The window seal originally provided with the truck can remain, as this would provide a desirable insulator or buffer between the elastic tunnel and the metal portion of the cab or bed unit about which the rubber seal is fitted.

In addition to the above-stated advantages, this assembly can be provided at a relatively low cost and can be manufactured and shipped inexpensively.

BRIEF DESCRIPTION OF THE DRAWING

The various features, advantages and other uses of the present invention will become more apparent by referring to the following detailed description and drawing in which:

FIG. 1 is a partial raised elevational view of a seal assembly in place between a truck cab and a bed unit;

FIG. 2 is a cut away detail view of the assembly partially shown in FIG. 1;

FIG. 3 is an enhanced detailed view of a construction of the seal assembly according to the present invention;

FIG. 5 is a view similar to that shown in FIG. 3 but revealing an alternate embodiment of the present invention.

DETAILED DESCRIPTION OF THE PREFERRED EMBODIMENTS OF THE PRESENT INVENTION

Figure 4:
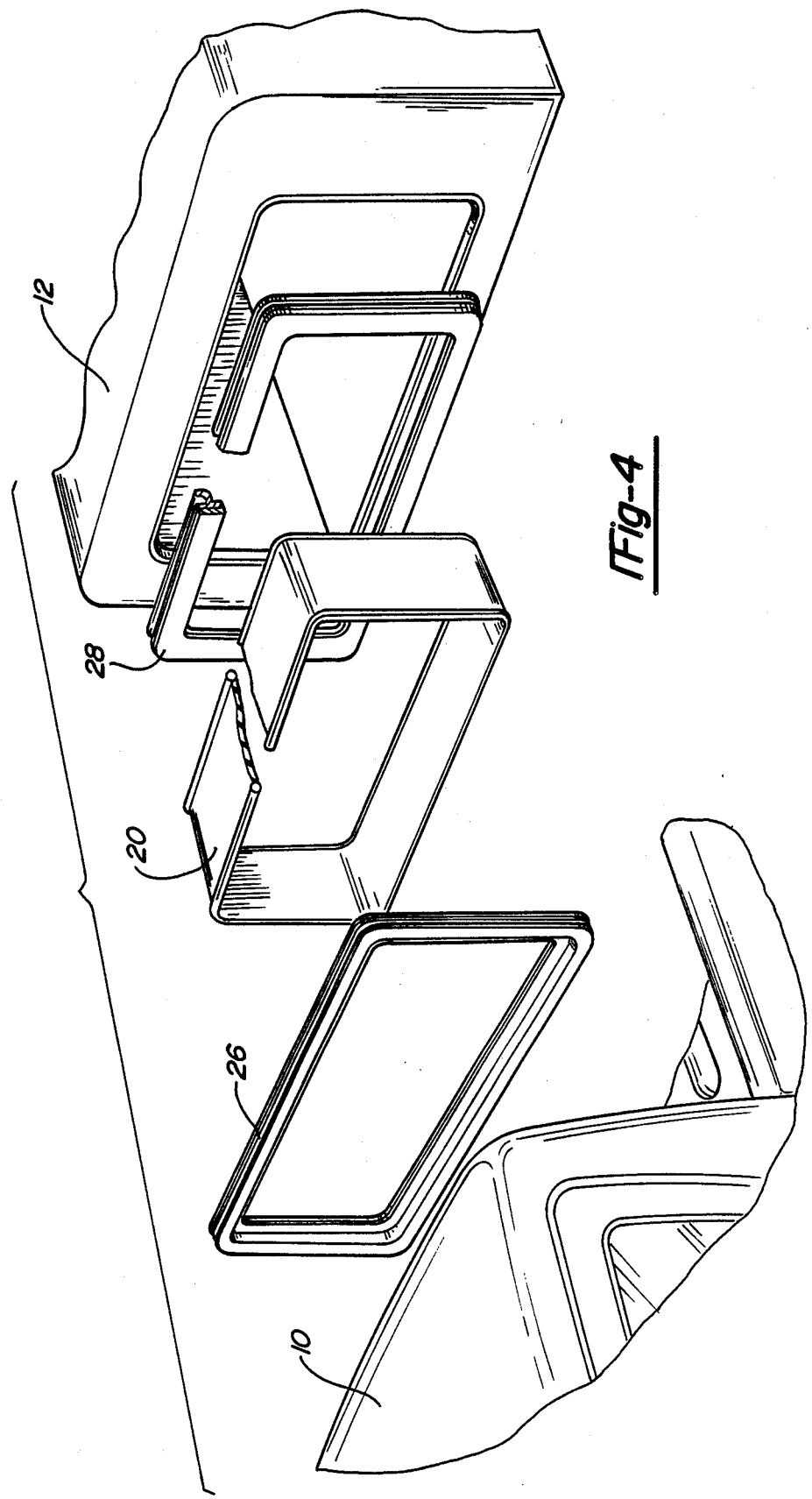
FIG. 4 is an exploded view showing the components of the present invention.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a partial view of a truck 10 and a bed unit 12 with the seal assembly of the present invention, generally indicated as 14, is shown. While the bed unit 12 is here shown as a truck bed cap, it must be understood that this unit may alternatively be a camper or a similar unit. FIG. 1 demonstrates the spacing conventionally present between the cab 10 and bed unit 12. The possibility of rain or snow entering either the cab 10 or the bed unit 12 is easily understood by this view, with the exception of the seal assembly 14 according to the present invention which provides against the elements and consequent seepage.

With reference to FIG. 2, a detailed cut away view of the window opening 16 of the cab 10 and the window opening 18 of bed unit 12 having the seal assembly 14 fitted therein and therebetween is illustrated. The seal assembly 14 mainly comprises an elastic tunnel 20 for providing communication between the cab 10 and the bed unit 12. As applied, the rear window (not shown) of the cab 10 has been removed, as has the front window (not shown) of the bed unit 12.

FIG. 3 better illustrates the construction of seal assembly 14 in detail. The elastic tunnel 20 is provided as will be described hereafter. If, as mentioned, above, the cab 10 and the bed unit 12 are provided with sliding windows, the windows need only be opened and the tunnel 20 set into place as described hereafter. If, however, the glass is of the fixed type, it has to be removed. After the glass is removed, a truck window seal 22, conventionally provided, and a bed unit window seal 24, also conventionally provided, are left in place.

A first frame member 26 is fitted on the inside of the cab 10, and a second frame member 28 is fitted on the inside of the bed unit 12. The frames 26, 28 may be fixed by conventional fasteners (not illustrated). To insulate the frames 26, 28 from the walls of the cab 10 and bed unit 12 respectively, a pair of insulators or gaskets 30 are fitted therebetween. The gaskets 30 serve the dual functions of providing a weather tight seal and eliminating possible problems resulting from metal-on-metal contact. (In lieu of the gasket 30, an adhesive may be employed.)

In cross section, the frame members 26, 28 have an "h" design. This design provides each of the frame members 26, 28 with a ring channel 32, 34 respectively.

The elastic tunnel 20 includes a first elastic ring 36 peripherally provided at its first end and a second elastic ring 38 peripherally provided at its second end. As can easily be seen from this illustration, the first elastic ring 36 is stretched to fit into the ring channel 32 of the first frame member 26. Tension holds the ring 36 in place. Similarly, the second elastic ring 38 is stretched to fit into the ring channel 34. Again, tension holds the ring 38 in place.

With the truck window seal 22 and the bed unit window seal 24 remaining in place, the elastic tunnel 20 is stretched thereover between two frame members 26, 28. The stretched character of the tunnel 20 forms a tight seal between itself and the seals 22, 24, thereby preventing the bypassage of water. Also because the tunnel 20 is stretched taught, even wind pressing against it when the truck is in motion does not affect its sealing characteristics.

Referring to FIG. 4, an exploded view illustrating the component parts of the present invention is shown. The frame members 26, 28 are illustrated as being of a suggested configuration, but this may be altered as required depending upon the size of the window openings in the cab 10 and the bed unit 12. Similarly, the tunnel 20 may be sized and configured as required.

FIG. 5 discloses an alternate embodiment of the present invention. According to this embodiment, instead of the first frame member 26 being fixed to the inside of the cab 10 as shown in FIG. 3, a first frame member 26' is fitted loosely within a channel 40 defined between the inner wall of the cab 10 and a first upper elongated rail 44. (Not illustrated is a lower elongated rail below the cab window opening and inside the cab 10.) The rail 44 is situated substantially along an upper edge 46 of the window opening of the cab 10.

Similarly, a second frame member 28' is loosely fitted within a channel 48 defined between the inner wall of the bed unit 12 and a second upper elongated rail 50. (Again a lower elongated rail [not shown] is fixed below the front window of the bed unit 12 substantially along the lower edge thereof.) The rail 50 is situated substantially along an upper edge 52 of the window opening of the bed unit 12.

According to this second embodiment, the frame members 26', 28' are free floating and may accordingly be more easily installed and removed.

Having described my invention, however, many modifications thereto will become apparent to those skilled in the art to which it pertains without deviation from the spirit of the invention as defined by the scope of the appended claims.

I claim:

1. A removable seal assembly interconnecting the rear window opening of a truck cab having an interior with an adjacent front window opening of a bed unit having an interior including a camper or a truck bed cap, said assembly comprising:

a stretchably elastic seal tunnel portion having a resiliently stretchable first end and a resiliently stretchable second end;

a first frame interiorly mounted in said cab;

a second frame interiorly mounted in said bed unit;

means for stretchably and frictionally interconnecting said first end of said tunnel with said first frame; and means for stretchably and frictionally interconnecting said second end of said tunnel with said second frame;

said first and second ends forming substantially weather tight seals with said first and second frames respectively.

2. For use with a truck cab having an inside and an outside and an upright wall and a bed unit having an inside and an outside and an upright wall including a camper or a truck bed cap, the walls being in spaced apart relation and having aligned and adjacent window openings, a removable seal assembly for interconnecting said cab with said bed unit wherein a weather tight seal is formed, said seal assembly comprising:

a stretchably elastic tunnel portion having a resiliently stretchable first end and a resiliently stretchable second end;

said first end including a first resiliently elastic peripheral ring;

said second end including a second resiliently elastic peripheral ring;

means for elastically and frictionally engaging said first elastic peripheral ring within said cab; and means for elastically and frictionally engaging said second elastic peripheral ring within said bed unit;

said means for elastically engaging said first ring with said cab and said means for elastically engaging said second ring with said bed unit being sufficiently resiliently elastic whereby moisture is substantially prevented from entering either said cab or said bed unit.

3. A removable seal assembly according to claim 2 wherein:

said means for elastically engaging said first elastic peripheral ring within said cab comprises a first frame member; and said means for elastically engaging said second elastic peripheral ring within said bed unit comprises a second frame member.

4. A removable seal assembly according to claim 3 wherein said first frame member and said second frame member each have a channel peripherally defined therein.

5. A removable seal assembly according to claim 4 wherein said first elastic peripheral ring is elastically and slottingly fittable within said channel of said first frame member.

6. A removable seal assembly according to claim 4 wherein said second elastic peripheral ring is elastically and slottingly fittable within said channel of said second frame member.

7. A removable seal assembly according to claim 3 wherein said second frame member is fixed on said inside wall of said upright wall of said bed unit.

8. A removable seal assembly according to claim 3 wherein said first and second frame members have the form of an "h" in cross section.

9. A removable seal assembly according to claim 3 wherein said first frame member is fixed on said inside of said upright wall of said cab.

10. A removable seal assembly according to claim 4 wherein said aligned and adjacent window openings comprise a first window opening in said upright wall of said cab having an upper edge portion and a lower edge portion and a second window opening in said upright wall of said bed unit having an upper edge portion and a lower edge portion.

11. A removable seal assembly according to claim 10 further including a first pair of parallel elongated rails provided within said cab wherein one of said pair is fixed substantially along said upper edge portion of said first window opening and the other of said pair is fixed substantially along said lower edge portion of said first window opening, each of said pair of elongated rails having a frame channel formed between said seal and a respective edge portion of said window when fixed thereto.

12. A removable seal assembly according to claim 11 wherein said first frame member includes an inner flange, said flange being fittable within said frame channels.

13. A removable seal assembly according to claim 10 further including a second pair of parallel elongated rails provided within said bed unit wherein one of said pair is fixed substantially along said upper edge portion of said second window opening and the other of said pair is fixed substantially along said lower edge portion of said second window opening, each of said pair of elongated rails having a frame channel formed between said seal and a respective edge portion of said window when fixed thereto.

14. A removable seal assembly according to claim 13 wherein said second frame member includes an inner flange, said flange being fittable within said frame channels.

15. A removable seal assembly according to claim 7 wherein said tunnel portion is stretched between said first frame member and said second frame member when fixed in place.

16. A removable seal assembly according to claim 7 wherein said tunnel portion is composed of a polymerized material.

17. A removable seal assembly interconnecting the rear window opening of a truck cab having an interior with an adjacent front window opening of a bed unit having an interior including a camper or a truck bed cap, said assembly comprising:

a stretchably elastic seal tunnel portion having a resiliently stretchable first end and a resiliently stretchable second end;

a first frame member fitted within said interior of said truck cab and a second frame member fitted within said interior of said bed unit;

means for elastically and frictionally holding said first end of said seal to said first frame member; and means for elastically and frictionally holding said second end of said seal to said second frame member;

each of said first and second frame members having a channel defined therein;

said means for elastically holding said first end of said seal to said first frame member comprising a first peripheral ring elastically and slottingly fittable within said channel of said first frame member; and said means for elastically holding said second end of said seal to said second frame member comprising a second peripheral ring elastically and slottingly fittable within said channel of said second frame member.

18. For use with a truck cab having an inside and an outside and an upright wall and a bed unit having an inside and an outside and an upright wall including a camper or a truck bed cap, the walls being in spaced apart relation and having aligned and adjacent window openings, a removable seal assembly for interconnecting said cab with said bed unit wherein a weather tight seal is formed, said seal assembly comprising:

an elastic tunnel portion having a first end and a second end;
said first end including a first elastic peripheral ring;
said second end including a second elastic peripheral ring;
means for elastically engaging said first elastic peripheral ring within said cab; and
means for elastically engaging said second elastic peripheral ring within said bed unit;
said means for elastically engaging said first elastic peripheral ring within said cab comprising a first frame member; and
said means for elastically engaging said second elastic peripheral ring within said bed unit comprising a second frame member;
said first frame member and said second frame member each having a channel peripherally defined therein;
said aligned and adjacent window openings comprising a first window opening in said upright wall of said cab having an upper edge portion and a lower edge portion and a second window opening in said upright wall of said bed unit having an upper edge portion and a lower edge portion; and
a first pair of parallel elongated rails provided within said cab wherein one of said pair is fixed substantially along said upper edge portion of said first window opening and the other of said pair is fixed substantially along said lower edge portion of said first window opening, each of said pair of elongated rails having a frame channel formed between said seal and a respective edge portion of said window when fixed thereto.

19. A removable seal assembly according to claim 18 wherein said first frame member includes an inner flange, said flange being fittable within said frame channels.

20. For use with a truck cab having an inside and an outside and an upright wall and a bed unit having an inside and an outside and an upright wall including a camper or a truck bed cap, the walls being in spaced apart relation and having aligned and adjacent window openings, a removable seal assembly for interconnecting said cab with said bed unit wherein a weather tight seal is formed, said seal assembly comprising:

an elastic tunnel portion having a first end and a second end;
said first end including a first elastic peripheral ring;
said second end including a second elastic peripheral ring;
means for elastically engaging said first elastic peripheral ring within said cab; and
means for elastically engaging said second elastic peripheral ring within said bed unit;
said means for elastically engaging said first elastic peripheral ring within said cab comprising a first frame member; and
said means for elastically engaging said second elastic peripheral ring within said bed unit comprising a second frame member;
said first frame member and said second frame member each having a channel peripherally defined therein;
said aligned and adjacent window openings comprising a first window opening in said upright wall of said cab having an upper edge portion and a lower edge portion and a second window opening in said upright wall of said bed unit having an upper edge portion and a lower edge portion; and
a second pair of parallel elongated rails provided within said bed unit wherein one of said pair is fixed substantially along said upper edge portion of said second window opening and the other of said pair is fixed substantially along said lower edge portion of said second window opening, each of said pair of elongated rails having a frame channel formed between said seal and a respective edge portion of said window when fixed thereto.

21. A removable seal assembly according to claim 20 wherein said second frame member includes an inner flange, said flange being fittable within said frame channels.

* * * * *